US012509836B2

(12) United States Patent
Allen et al.

(10) Patent No.: US 12,509,836 B2
(45) Date of Patent: Dec. 30, 2025

(54) STORM SURGE PROTECTION SYSTEM

(71) Applicant: PLASTIC TIES TECHNOLOGIES LLC, Rockville, MD (US)

(72) Inventors: David H. Allen, College Station, TX (US); Allen R. Kronstadt, North Bethesda, MD (US)

(73) Assignee: PLASTIC TIES TECHNOLOGIES LLC, Rockville, MD (US)

( * ) Notice: Subject to any disclaimer, the term of this patent is extended or adjusted under 35 U.S.C. 154(b) by 57 days.

(21) Appl. No.: 18/640,566

(22) Filed: Apr. 19, 2024

(65) Prior Publication Data
US 2024/0352696 A1   Oct. 24, 2024

Related U.S. Application Data

(60) Provisional application No. 63/497,264, filed on Apr. 20, 2023.

(51) Int. Cl.
*E02B 3/06* (2006.01)
*E02B 3/14* (2006.01)
*E02D 29/02* (2006.01)

(52) U.S. Cl.
CPC .............. *E02B 3/14* (2013.01); *E02B 3/06* (2013.01); *E02D 29/0225* (2013.01); *E02D 29/0266* (2013.01); *E02D 2300/0006* (2013.01); *E02D 2300/0034* (2013.01); *E02D 2600/30* (2013.01)

(58) Field of Classification Search
CPC ......... E02B 3/14; E02B 3/06; E02D 29/0225; E02D 29/0266; E02D 2300/0006; E02D 2300/0034; E02D 2600/30
See application file for complete search history.

(56) References Cited

U.S. PATENT DOCUMENTS

| | | | | |
|---|---|---|---|---|
| 244,640 A | * | 7/1881 | Maxson et al. | E02B 3/06 405/21 |
| 482,059 A | * | 9/1892 | Kenway | E02B 3/06 52/125.3 |
| 486,885 A | * | 11/1892 | McIntyre | E02B 3/14 52/530 |
| 929,728 A | * | 8/1909 | Taylor | E02B 3/127 405/19 |

(Continued)

FOREIGN PATENT DOCUMENTS

| | | |
|---|---|---|
| CN | 113152363 B | 5/2022 |
| KR | 20090008488 U | 8/2009 |
| KR | 101313568 B1 | 10/2013 |

*Primary Examiner* — Benjamin F Fiorello
(74) *Attorney, Agent, or Firm* — Dickinson Wright PLLC (57) ABSTRACT

A storm surge protection barrier is provided for a shore line bordering a sea that is prone to storm surges. The barrier includes a plurality of individual wall sections each having a plurality of plastic-based structural beams joined by at least one cross structural cross tie. The wall sections each have an above-grade upper portion of a predetermined first length, LAB and a below-grade lower portion of a predetermined second length LBG, and wherein LAB>2LBG. The wall sections are arranged upright and buried in a trench of the shore line in side-by-side succession to form a continuous barrier wall with the below-grade lower portions disposed in the trench and the above-grade upper portions projecting upwardly out of the trench at a predetermined tilt angle away from the sea of between 1 and 10 degrees.

19 Claims, 5 Drawing Sheets

(56) References Cited

U.S. PATENT DOCUMENTS

| | | | | |
|---|---|---|---|---|
| 2,045,112 | A | * | 6/1936 | Upson ........................ E02D 5/74 |
| | | | | 405/262 |
| 4,362,432 | A | * | 12/1982 | Conover .................... E02B 3/14 |
| | | | | 405/15 |
| 4,407,608 | A | * | 10/1983 | Hubbard .................... E02B 3/06 |
| | | | | 405/25 |
| 5,174,681 | A | | 12/1992 | Atkinson et al. |
| 5,222,342 | A | * | 6/1993 | Defferrari ................. E02B 3/14 |
| | | | | 52/604 |
| 5,224,794 | A | | 7/1993 | Atkinson et al. |
| 5,509,755 | A | * | 4/1996 | Olsen ........................ E02B 3/04 |
| | | | | 405/15 |
| 5,655,851 | A | * | 8/1997 | Chor ......................... E02B 3/06 |
| | | | | 405/15 |
| 5,899,632 | A | | 5/1999 | Martin |
| 6,033,155 | A | | 3/2000 | Irvine et al. |
| 6,186,703 | B1 | * | 2/2001 | Shaw .................. E02D 29/0241 |
| | | | | 405/262 |
| 6,367,208 | B1 | | 4/2002 | Campbell et al. |
| 7,263,736 | B2 | | 9/2007 | Goodman et al. |
| 10,550,535 | B2 | | 2/2020 | Villar |
| 11,661,716 | B1 | * | 5/2023 | Jonassen ................. E02B 3/123 |
| | | | | 405/20 |
| 11,866,898 | B2 | * | 1/2024 | Jie ............................. E02B 3/06 |
| 2001/0053310 | A1 | * | 12/2001 | Brown ...................... E02B 3/14 |
| | | | | 404/43 |
| 2013/0031852 | A1 | * | 2/2013 | Hill ....................... E01F 8/0023 |
| | | | | 52/302.1 |
| 2020/0208366 | A1 | * | 7/2020 | Chapron ................... E02B 3/06 |
| 2021/0172137 | A1 | * | 6/2021 | Abeles ................... E02B 3/108 |

* cited by examiner

STORM SURGE PROTECTION SYSTEM

CROSS-REFERENCE TO RELATED APPLICATION

This U.S. Utility patent application claims the benefit of U.S. Provisional Application Ser. No. 63/497,264, filed Apr. 20, 2023, which is incorporated herein by reference in its entirety.

BACKGROUND

1. Technical Field

The present disclosure relates to structures used for protecting shorelines against damage from storm surges.

2. Related Art

Hurricanes and other severe tropical storm events are becoming more prevalent and severe with the change in global climate. These storm events can produce high winds exceeding 155 miles per hour which can be cyclonic, and also bring heavy rains. Severe property damage to properties and the environment is common, including downed trees and utility lines, broken windows and severe damage or destruction to homes and business. Communities and properties situated along coastal fronts often face the added threat of storm surges, a phenomenon in which atmospheric pressure changes, high winds and strong waves produced by these storm events push the sea towards coast causing it to suddenly rise above normal tidal levels which can overwhelm the shoreline and cause massive and catastrophic loss of property and life due to severe sustained flooding and erosion.

Numerous coastal regions need a structure that can resist ocean waves. Communities use a variety of barriers to protect themselves from both the forces and the flooding/erosion that can occur, but current alternatives are too costly to install and maintain, rendering them impractical as a viable shoreline protection solution for the thousands of miles of shoreline susceptible to loss.

SUMMARY

An object of the present disclosure is to provide a shoreline protection system that is simple and cost-effective to manufacture and install along vast stretches of oceanic shoreline susceptible to storm surge damage.

A shoreline protection system comprises a plurality of individual mats that are arranged along a shoreline to present a barrier against storm surges. Each mat comprises a plurality of structural beams made of plastics material. The beams are tied together by cross bolts or the like. Each mat is reinforced with a plurality of metallic reinforcement plates or beams which strengthen the mat. The mats are of a size and weight which can easily be transported to a location by a tractor trailer. Optionally, the mats can be supplied in individual components or subcomponents and assembled on site with minimal skill required. The mats are of predetermined length. The size enables a predetermined lower section of the mat to be buried below ground level in order to anchor the mat, with the remaining predetermined upper section projecting above ground level at a height determined to be sufficient to contain the level of storm surge associated with the particular location. In an exemplary embodiment, 14 feet of mat projects above ground while 6 feet of mat is buried.

The mats are advantageously designed and sized, both as to dimension and weight, to further facilitate a simple, fast, and low-cost installation of the mats along a shoreline. The length of the mats can be set by the required exposure and burial dimensions for the given application, for example 14+6 feet, for a total length dimension of, for example, 20 feet. The width of a mat can vary as needed by varying the number of structural plastic beam members included in a mat section. For example, a fast and economic installation on a shoreline may involve use of inexpensive equipment that may have limited lifting capacity. If, for example, the established maximum weight restriction is set at 3,000 lbs, the number of beam members can be selected to bring the weight of the mat sections at or below the weight limit of the equipment to be used.

Once the trench is dug to the desired depth, a mat section is lowered into the trench, with a face of the mat section facing the sea and a back of the mat facing the land to be protected. Additional mat sections may be placed in the trench in similar manner to create a continuous wall or barrier of side-by-side mat sections. The trench may be filled in with soil and the backside of the wall sections backfilled with more soil up to the level of the wall, if desired. This creates an earthen berm on the backside that is shielded by the wall of wall sections of the seaward side. The soil and wall of mat sections work in symbiotic relation to support one another and, in turn, to provide sufficient strength and integrity to withstand the force of a storm surge and to protect the communities against catastrophic damage from the storm surge, which neither the soil berm nor the wall could do on their own.

The wall created from the mat sections may include additional features to enhance strength and integrity of the wall in the face of a storm surge. The mat sections may be further anchored in the ground by provision of one or more anchoring rods or pilings that are driven into the earth below the level of the mat sections to provide greater resistance to undesired movement of the mat sections when under load of a storm surge. Adjacent wall sections may also be tied structurally to one another in some manner to unite them as one structure by means such as metal plates, a steel cable laced through aligned lateral passages in the mat sections, I-beam piling driven into the earth between adjacent mat sections and supporting their edges with the channels of the I-beams, and/or angular bracing that extends from the mat sections at an angle toward the shore and either exposed our buried in the berm.

The wall created by the mat sections may preferably be angled away from the sea and toward shore. The tilt angle may depend on the particular installation, but a range of 1 to 10 degrees and more preferably 4 to 7 degrees is contemplated. The tilting of the wall helps lessen the impact of the storm surge. The landward edge of the trench forms a fulcrum about which the wall sections may be urged landward above ground level and seaward below ground level and resisted by the landward berm above grade and the seaward trench wall below grade.

The mat sections may further include a deflector that projects at an obtuse angle away from the mat sections adjacent their upper ends toward the sea. As the sea level rises and waves impact the wall, they are caused to be redirected back toward the sea by the deflector in order to prevent the surging sea from overwhelming the wall.

The plastic-based beams of the mat sections advantageously impart elastic flexibility to the wall to absorb and dissipate some of the wave energy of the storm surge as it encounters the wall. Additional force dissipation is realized by the berm which absorbs energy from the flexing of the wall sections. The flexible wall sections also wave the added benefit of packing the soil of the berm so as to increase the integrity of the berm under the action of a storm surge. The tilt angle and fulcrum from the trench and engineered length of buried lower mat sections also contribute to the favorable interaction of the mat sections with the berm, including continual packing of the soil.

The plastics-based beams have the further advantage of being rot proof, especially in a seashore environment where prolonged sun, erosive blowing sand and corrosive salty air can erode and compromise other materials including wood and concrete. The plastics-based beams are also environmentally stable, as they do not absorb moisture nor alter in dimension in changing moisture conditions. They are also environmentally neutral, as they neither leach nor absorb contaminants and are resistant to growth of bacteria and other organisms which may be undesirable for the environment. The bottom portion and backside of the wall sections are in continuous contact with the soil. The seaward face of the wall sections may be exposed to the elements which may include blowing sand, salty air and sun exposure. Over time or during installation, it is contemplated that some or all of the seaward face may be covered in sand or soil, either by the installer or by action of the wind which may deposit an accumulation of sand against and around the wall sections, effectively burying them in time within an earthen berm. The plastics beam material is highly beneficial to the overall design in that it is able to withstand exposure to the harsh ocean-front conditions of wind, sun, san, salt, water, rain, moisture, insects, stresses, waves, surges, debris, impact, burial and chemicals.

The plastic-based beams can be made of a single low cost plastic, a blend of plastics, composite plastics or combinations thereof. A mat section may have, for example, 7 beam sections and 3 of those may be high strength composite plastic-based beams and the others may be a low-cost blended plastic.

The wall sections constructed with the plastic-based beams are thus corrosion-resistant, lightweight, have sufficient strength, are easy to manipulate and install, can be arranged in a variety of configurations, are machinable at the jobsite, and have a very long design life with little or no annual maintenance. This makes the design life cost significantly less than common alternatives.

THE DRAWINGS

These and other features and advantages will be better understood when considered in light of the following detailed description and drawings, in which.

DETAILED DESCRIPTION

Figure 1:
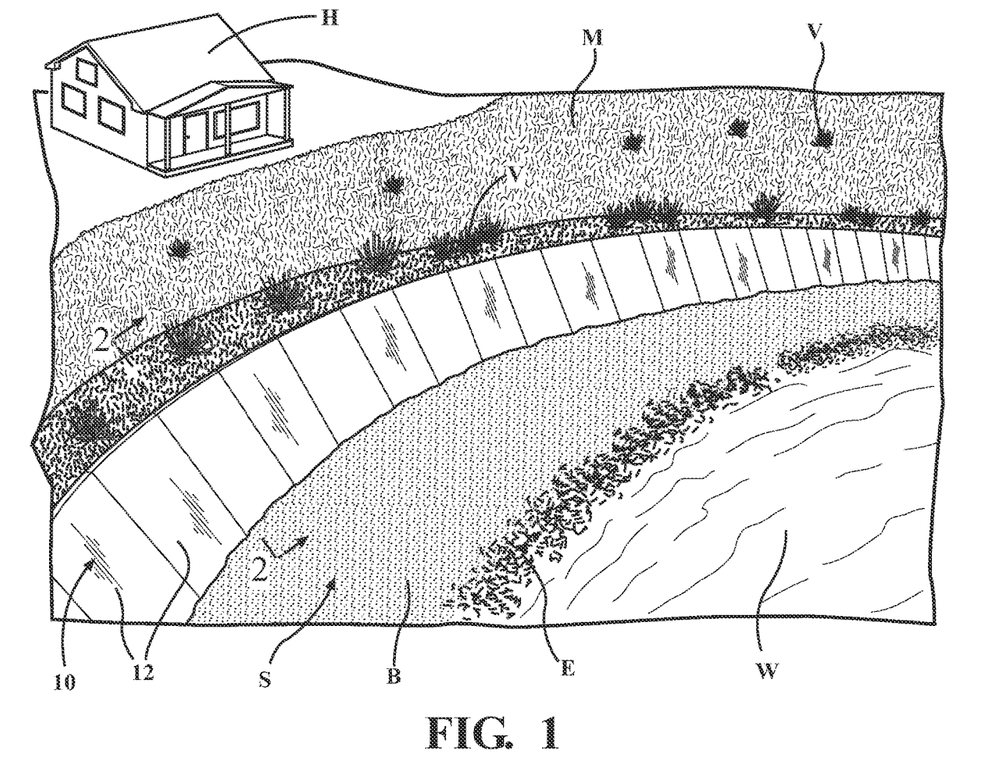
FIG. 1 is a schematic perspective view of a protective wall shown installed along a oceanic shoreline.

FIG. 1 illustrates a representative shoreline along an ocean or other large body of water W that has a beach front B and housing H or other property to be protected that is set back from the water's edge E by an intervening land mass M. Such ocean front properties are subject to extreme flooding and damage from oceanic storm surges brought about by periodic extreme weather events including hurricanes, which act to drive a mass of water toward the shore where its level quickly rises and surges toward land. Severe beach erosion and flooding of properties and communities adjacent the shoreline can occur from such events, causing loss of life and properties and exposing residents and communities to billions of dollars in loss and reconstruction.

FIG. 1 shows an embodiment of a storm surge protection wall 10 that has been installed along the shoreline to protect land M and communities C on the landward side of the wall 10 against damage from ocean waves and mass flooding from storm surges. The wall 10 is engineered, as further described below, to present a physical barrier to the storm surge, containing it on the ocean side of the wall during a storm surge event. The wall 10 is effective while at the same time practical. It is relatively inexpensive to produce and is environmentally responsible and respective of the natural landform that property owners desire.

Figure 6:
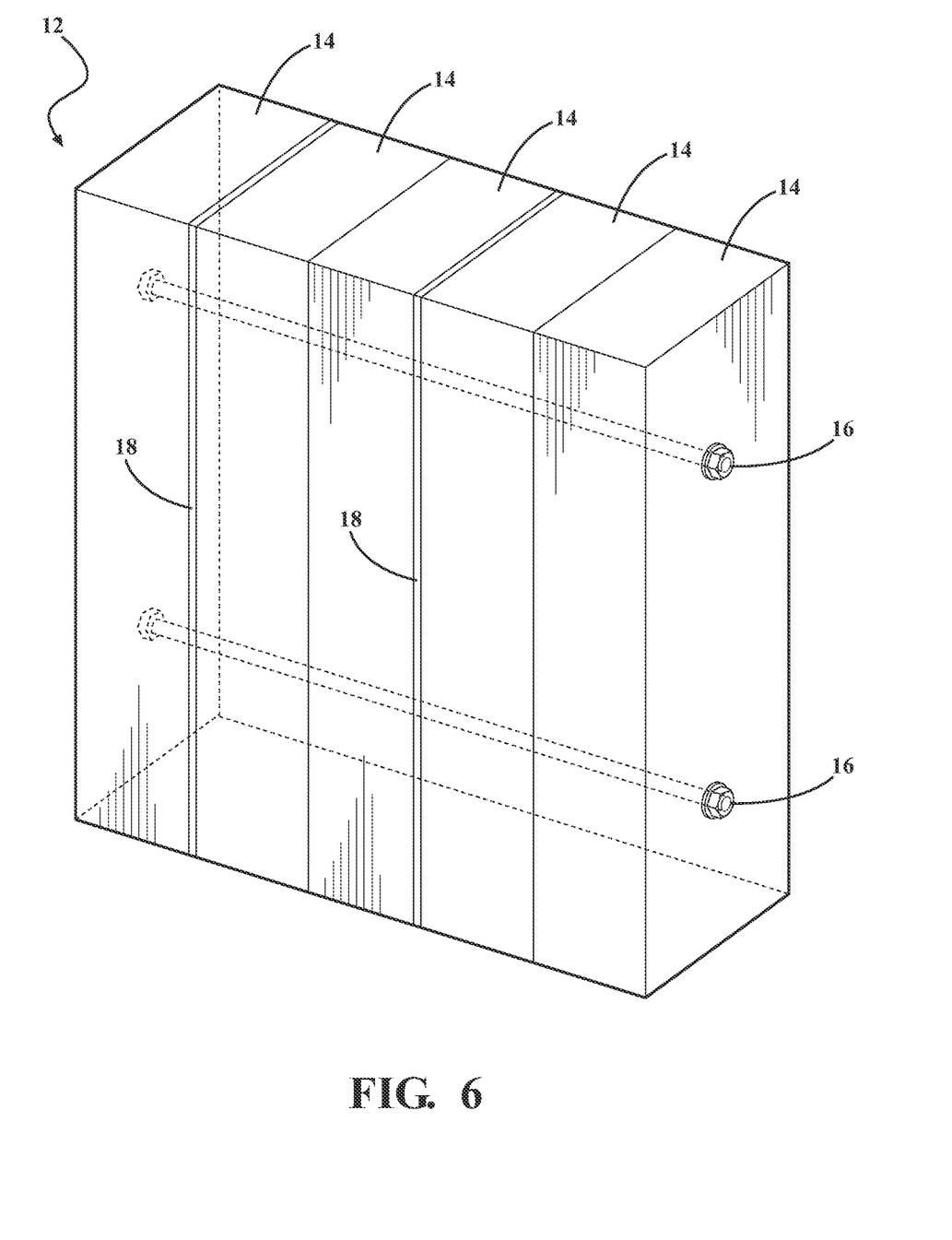
FIG. 6 is a schematic perspective view of an exemplary wall section.

As illustrated by a representative embodiment of FIG. 6, the wall 10 is made up of a plurality of individual constructed wall sections 12 each made up of a plurality of structural beam members 14 of defined length, width and thickness. A preferred and advantageous material of the structural beams is plastic-based materials, including single component plastics, blended plastics and composite plastics. The use of plastic in a harsh ocean front environment offers several advantages not found with other common building materials for walls, including wood and concrete. Plastic is able to be placed in direct contact with the ground without rotting or absorbing moisture; is able to be buried without rotting or absorbing moisture; is able to be exposed in a windy, abrasive beach front environment without eroding; is able to withstand hot, high humidity, wet conditions for prolonged periods without rotting or degrading in properties; is able to tolerate salt water and salty air without degrading; is a cost-effective material which can include use of environmentally-friendly recycled plastic materials; is able to resist contamination from foreign matter and species such that the beams could be recovered from one installation and cleaned and reused in another location without concern for contaminating the new location with impurities or invasive species from the prior location; and is easy to lift and manipulate with basic tools and equipment.

One preferred material for the plastic beams includes HDPE (high density polyethylene).

The beam members 14 of mat sections 12 are arranged side-by-side and are secured together across their width by a plurality of cross-bolt and nut fasteners 16 to form a mat-like structure. The fasteners 16 extend through the plurality of beam members 14 and may have a head at one end and a threaded shank portion on the opposite end to receive a screw nut. The fasteners 16 clamp or squeeze the members 14 together to form a rigid, unified structure of the wall section 14. The size and number of beam members 14 included in each wall section 12 may depend on the particular installation. The beam members 14 may have a cross section of 8 to 12 inches wide between their opposite sides and 8 to 12 inches thick between their opposite front and rear faces. A representative beam 14 may have a width×thickness measurement of 8'×8'. The term "front" when used in connection with the beam members 14 and the wall 10 and wall sections 12 means the face that faces the body of water W and which will receive the impact of a storm surge. The "rear" or "back" means the opposite side which faces away from the body of water toward the land mass M and properties H to be protected on a landward-side of the beams 14, wall sections 12 and wall 10. The length of the beam members 14 may vary between 14 to 26 feet and more preferably between 16 to 24 feet, and still more preferably between 18 to 22 feet. In a particular non-limiting embodiment illustrated in FIG. 2, a wall section 12 made of a plurality of beams 14 has a length of 20 feet.

As also shown in FIG. 6, each wall section 12 is further strengthened by at least one reinforcement member 18 made of a material that is different than the material of the beam members 14. In a preferred embodiment, the at least one reinforcement member 18 comprises a metal plate which is relatively stiffer and stronger than the plastic beam members 14. The metal plate 18 is preferably interleaved between one or more pairs of adjacent beam members 14. The reinforcement member 18 may comprise, for example, a metal plate of predetermined thickness, such as ¼" steel plate. The length and width of the plate may correspond to the length and width of the adjacent beam members 14. Some of the plates 18 may be longer than others and longer than the beams 14 and could be sunk into the ground as anchoring support.

Figure 5:
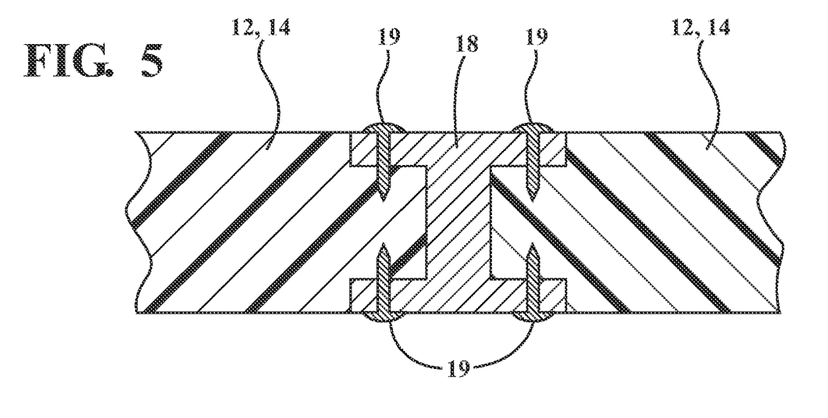
FIG. 5 is an enlarged fragmentary plan view illustrating a wall connecting reinforcement feature.

In another embodiment, as illustrated in FIG. 5, the reinforcement member 18 is in the form of a structural steel beam and preferably an I-beam, with the long leg of the I-beam interleaved between facing side faces of the adjacent plastic beam members 14 and the two pairs of short legs at opposite ends of the I-beam 18 overlying front and back surfaces of the adjacent plastic beam members 14, such that a load applied to front or back face of one beam member 14 is transferred through the I-beam and shared with the other paired plastic beam member 14. There may be multiple reinforcement members 18 provided in a wall section 12 and one or more of the reinforcement members 18 may extend beyond an end of the plastic beam members 14 of the wall section 12.

Figure 10:
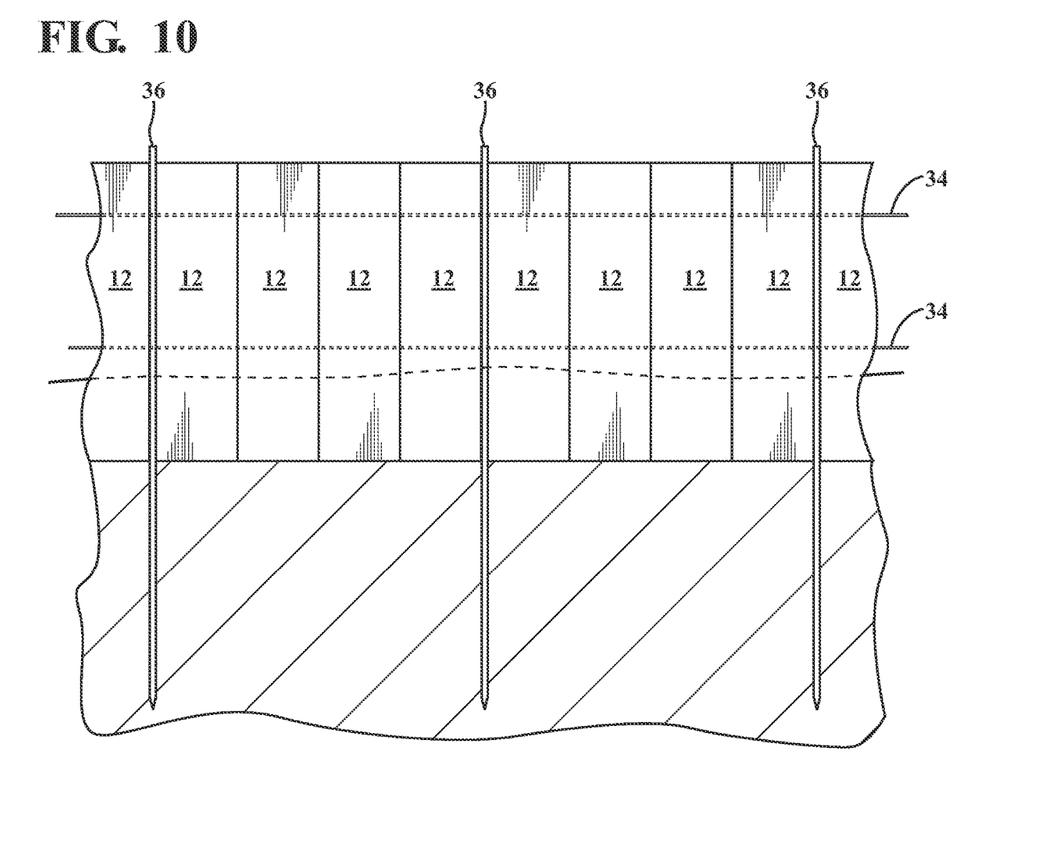
FIG. 10 is a fragmentary elevational front view of another embodiment.

In a particular example, the extended reinforcement members 18 may comprise an I-beam and the lower end may extend several feet below the lower surface of the wall section 12 and may be embedded deep into the ground to serve as a piling or anchor. Such extended anchoring I-beams may be provided periodically among several wall sections, as illustrated in FIG. 10 and may be located at the very edge or edges of the wall sections 12 to interconnect and support adjacent wall sections 12 of the wall 10. The fasteners 16 preferably extend through the reinforcement members 18 by means of aligned holes provided in the members 14, 16. As shown in FIG. 5, additional fasteners 19 in the form of lag screws, for example, may extend through openings in the short legs of the I-beam and be screwed into the adjacent beam members 14 nested in the I-beam channels to further secure the wall sections 12 to the I-beams. The beams 14 that are received in the I-beam channels are preferably recessed along their edges, as illustrated in FIG. 5, such that there is a tongue-in-groove joint to further enhance the structural integrity of the wall sections 14 against storm surge loads.

The simple structure and construction of the wall sections 12 offers several approaches to building the wall along an ocean shoreline. In one embodiment, the wall sections 12 are pre-assembled off-site and advantageously made of a size that can be readily and inexpensively transported to the installation site by conventional flat bead tractor-trailer rigs, where they can be easily off-loaded using conventional handling equipment, such as tractors and cranes. Alternatively, the disassembled components of the wall sections 12 can be transported to the installation site and workers can assembly the wall sections 12 on-site using standard equipment for handling and arranging the members 14, 16 and then joining them together by the fasteners 16.

Figure 2:
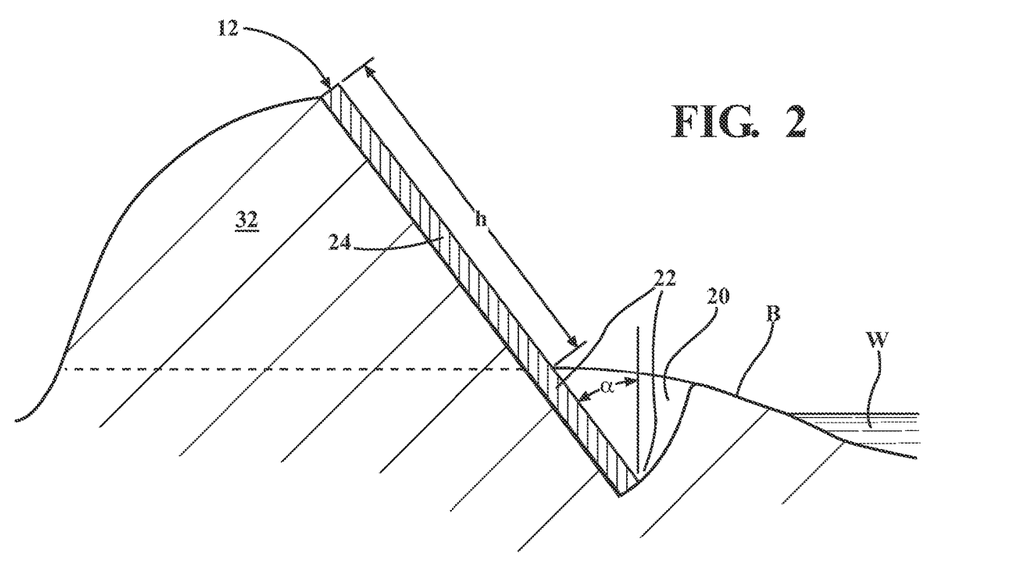
FIG. 2 is an enlarged schematic fragmentary longitudinal cross-sectional view of the wall taken along lines 2-2 of FIG. 1.

Building the wall 10 is also a simple and relatively inexpensive operation according to the disclosure. A location for the wall 10 is selected set back from the normal high tide mark of the ocean and in front of the properties H to be protected. In a typical installation, a strip of the beach B is present between the ocean W and the front of the wall 10 and a stretch of land M between the properties H to be protected and the back of the wall 10. FIG. 1 is illustrative of such an installation. Once the location is selected, a trench 20 is made to a predetermined depth, as illustrated in FIG. 2. The depth may depend on the ground structure, but a typical installation may include a trench of about 4-8 feet deep, for example at least 6 feet deep. The trench would extend below the beach sand layer and into the underlying stable base layer of earth.

Still referring to FIG. 2, a lower end portion 22 of the wall section 14 is lowered into the trench 20 by conventional equipment, such as a crane or tractor such that the lower end 22 resides below grade by the depth of the trench 20 (e.g., by 6 feet). The remaining upper portion 24 of the wall section 24 extends above grade to a desired height determined to be necessary to protect the particular properties from flooding due to a storm surge. The upper section 24 may extend 10 to 18 feet or more above grade. In one example, the upper portion 24 projects 14 feet above grade.

Figures 3, 4:
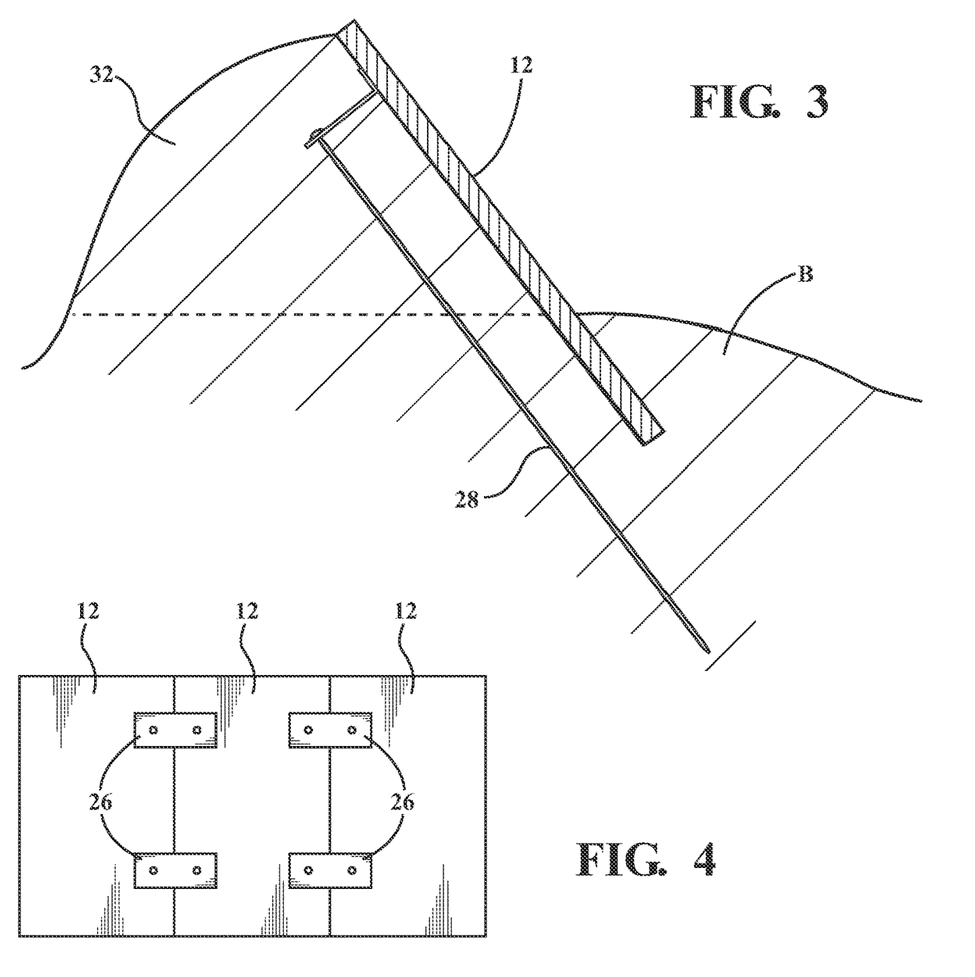
FIG. 3 is a schematic sectional view of a wall anchoring feature.
FIG. 4 is an elevation view illustrating a wall connecting feature.

The wall section 12 is preferably titled slightly away from the ocean toward the property to be protected at a predetermined angle a which may range from 1 to 20 degrees. In a preferred embodiment, the angle a is set to about 10 degrees which is effective at containing the surge while lessening the impact on the wall. The tilting is show exaggerated in FIG. 2 for illustrative purposes. Additional wall sections 12 are added to the trench 20 in side-by-side arrangement to construct a continuous or near-continuous span of wall sections 12. Adjacent wall sections are preferably joined to another such as by structural brackets or cleats 26 that extend crosswise to neighboring wall sections and which may be anchored to the wall sections 12 by bolts or the like, as illustrated in FIG. 4. As mentioned, I-beams 18 may be provided to unite facing edges of neighboring wall sections 12 and fasteners may also be driven into the beams 14 through the short legs of the I-beams on the front or back or both sides to further secure the adjacent wall sections 12 to one another.

Select ones of the plastic beam members 14 may be longer at the bottom and the extended portion may be driven further into the earth at the base of the trench to serve as pilings.

Figure 7:
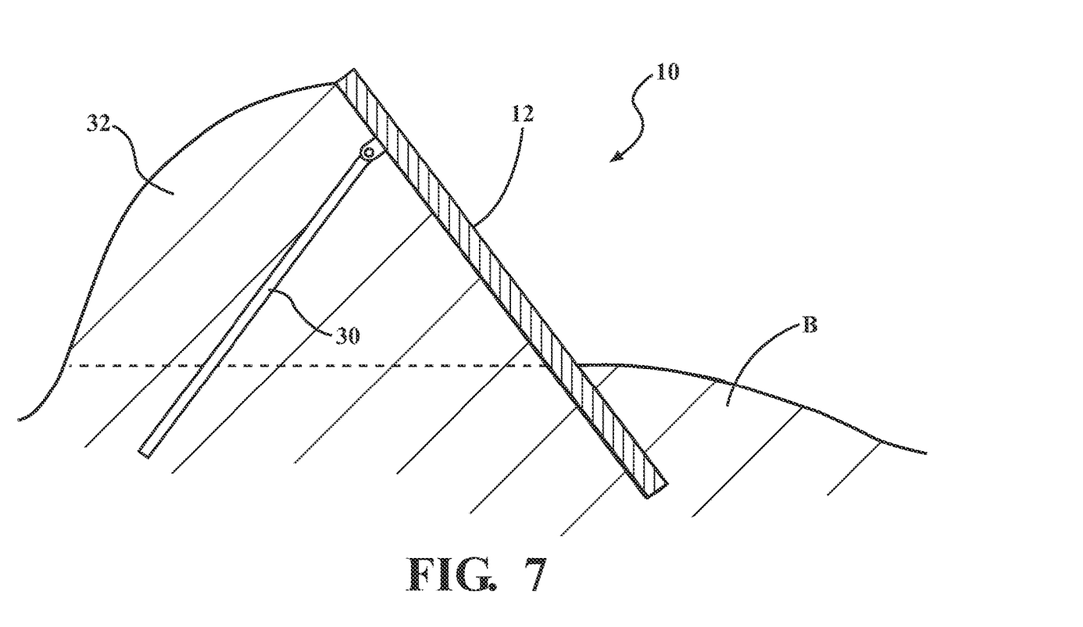
FIG. 7 is a schematic sectional view of a wall supporting feature.

Other supplemental anchoring systems may be employed, such as anchoring rods 28 which may be extended through associated anchoring points of the wall sections 12 and driven deep into the earth, as illustrated in FIG. 3. The backside of the wall sections 12 may further include bracing members 30, as illustrated in FIG. 7, which extend at an angle from the wall sections 12 and engage or penetrate the ground at a location landward of the wall sections 12 to provide added support against storm surge forces against the front of the wall which would want to push the wall shoreward. The bracing members 30 may further serve as kick stands to help support the wall sections 12 in the desired upright positions and angle after placement in the trench and prior to filling, as described below.

After placement of the wall sections 14 in the trench to the desired depth and angle, the trench is back filled with dirt. An earthen berm 32 is to be provided on the landward side of the trench 20 to serve as direct support to the wall 10. To the extent the berm 32 is not already naturally present, the berm 32 is to be constructed by hauling and packing dirt immediately behind the wall sections 12 to the height of the wall sections 12. In the case where the wall sections 12 extend 14 feet above grade on the front side facing the ocean, the berm 32 is built to about 14 feet on the back side up against the wall sections 12 and tapers off to blend in with the natural grade of the land mass M over the course of several feet, such as 20 feet. Over time, sand and vegetation V deposit and grow on the berm 26 to help strengthen the berm 32 and it becomes part of the landscape with a natural appearance. The berm 32 will become more compacted over time and during a storm event, the berm 32 will provide a firm backing to the wall 10, and may further compact while absorbing forces from the storm surge transmitted through the wall 10. The front face of the wall 10 may also become covered or partly covered with sand and plant life and take on a natural appearance, all the while protecting the properties behind the wall 10 from a storm surge.

As illustrated in FIG. 10, one or more structural steel cables 34 may thread through openings in the wall sections 12 to tie the wall sections 12 together. The cables 34 may extend through or be secured to one or more of the reinforcing pilings 36 which may comprise extended length I-beams, members 14 or combinations thereof. The cables 34 serve to help dissipate force from a storm surge event so that no one wall section 12 would take an excessive load and compromise the entire wall 10. For example, if heavy debris (e.g., a boat) is driven by the storm into a given wall section, the localized impact would be transmitted from the impacted wall section 12 to the cables 34 and spread the force to several neighboring mats 12 to help dissipate the load. The mats 12 are somewhat flexible by design since their beams 14 are made of plastics. The energy absorption from flexing is enhanced with provision of the cables 34 which helps further dampen to forces of the storm surge.

Figure 8:
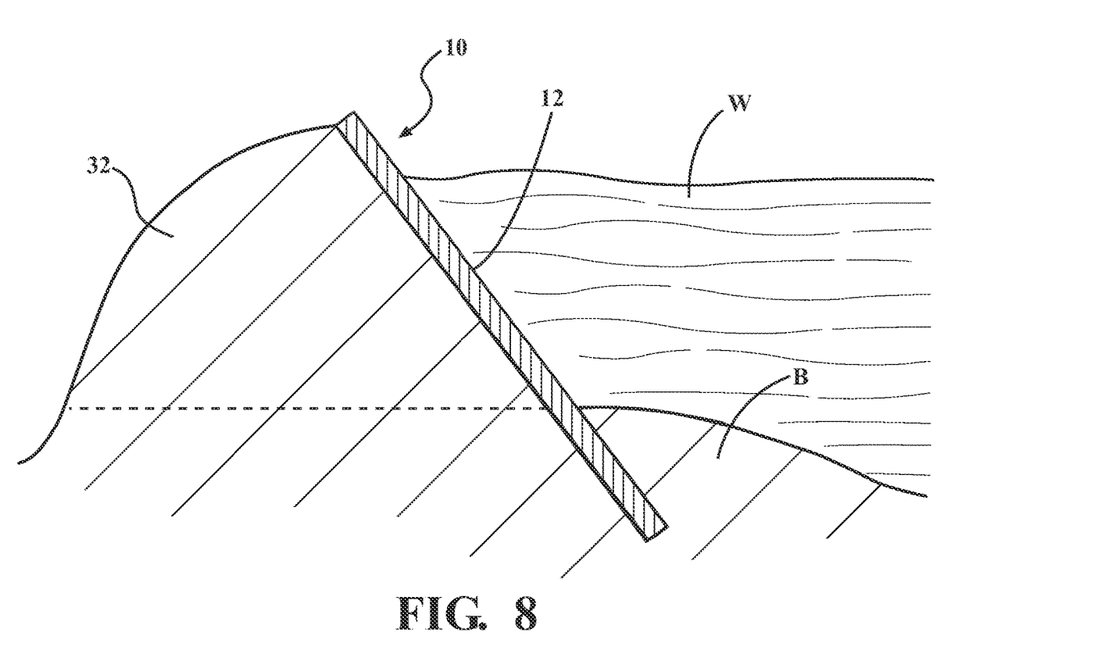
FIG. 8 is a view like FIG. 2 under storm surge conditions.

FIG. 8 illustrates a storm surge event where it can be seen that the water level has risen several feet above the normal high tide mark to a level that would otherwise cause severe flooding of the properties H landward. The wall 10 is able to contain the surging waters and present catastrophic flooding. The height of the wall, such at 14 feet above grade, is engineered to be sufficient to protect the targeted properties from storm surges for the particular location. It is expected that the wall 10 installation could extend several miles in length. It is anticipated that there may need to be designed breaks in the wall to provide uninhibited access for ocean and wild life, such as along sea turtle nesting beaches. The wall 10 may be reconfigured in these areas to either extend around the areas of concern or may have sections which are simply open. In the latter case, in the event of a projected severe weather alert where storm surges and flooding are a measured possibility, temporary filler sections could be placed to fill the gaps until such time as the threat subsides. For example, if a wall is interrupted by removal of one or two wall sections for wildlife access, these panels could be quickly positioned in the event of a storm and then removed once the threat clears. If I-beam pilings are employed in the gap areas, the wall sections could be dropped in place and braced by the short legs of the I-beams and further secured by temporary fasteners is needed.

Figure 9:
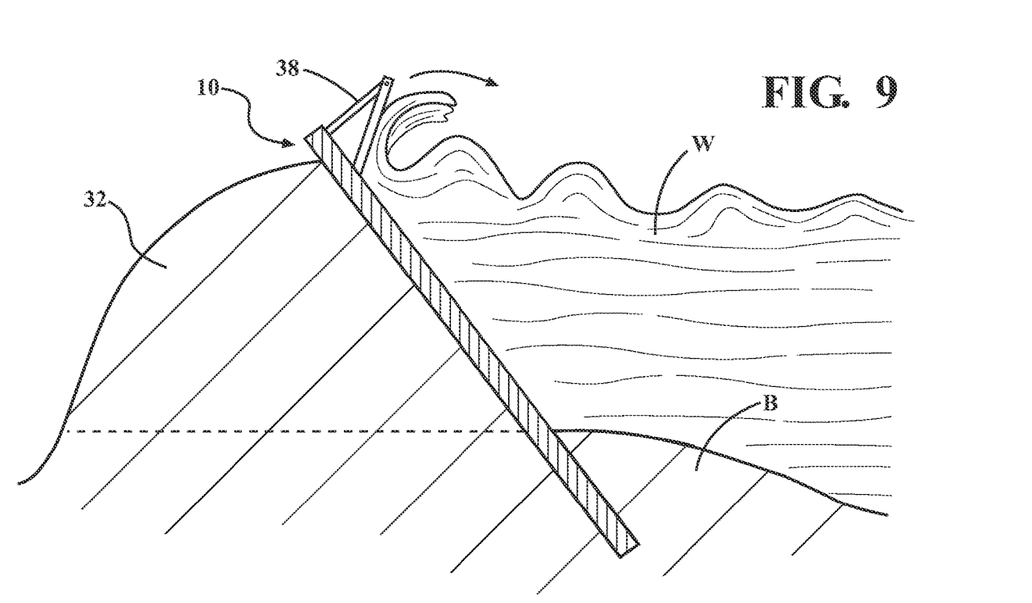
FIG. 9 is a view like FIG. 8 illustrating a wave redirecting feature.

Wave redirection features may be provided to the wall 10 to enhance the ability of the wall to prevent flooding from storm surges, as illustrated in FIG. 9. The top of the upper portions 24 of the wall sections 12 may be provided with wave deflectors 38. The wave deflectors 30 form an angle with the front of the wall sections 10 and are inclined toward the ocean by a predetermined amount. As the water from a storm surge rises against the face of the wall 10 and building waves from the surge climb the face of the wall 10, the eventually encounter the wave deflector 30 which is engineered to deflect and redirect the wave back toward the ocean to prevent the waves from overwhelming the wall 10 and flooding the protected area behind the wall 10.

The above embodiments are exemplary are not limiting of the invention.

What is claimed is:

1. A storm surge protection barrier for a shore line bordering a sea that is prone to storm surges, comprising:
   a plurality of individual wall sections each comprising a plurality of plastic-based structural beams joined by at least one cross structural cross tie;
   wherein the plurality of individual wall sections each have an above-grade upper portion of a predetermined first length, $L_{AB}$ and a below-grade lower portion of a predetermined second length $L_{BG}$, and wherein $L_{AB} > 2L_{BG}$;
   wherein the plurality of individual wall sections are arranged upright and configured to be buried in a trench of the shore line in side-by-side succession to form a continuous barrier wall with the below-grade lower portions disposed in the trench and the above-grade upper portions projecting upwardly out of the trench at a predetermined tilt angle away from the sea of between 1 and 10 degrees;
   metal reinforcements engaging at least some of the wall sections;
   wherein a backside of the barrier wall away from the sea is configured to be supported by an earthen berm extending above grade of the shoreline on which it is installed;
   wherein at least some of the wall sections include pilings configured to be driven into the earth below grade to enhance support of the barrier wall against forces of a storm surge; and
   at least one steel cable threaded through the wall sections and pilings to further reinforce the barrier wall.

2. The storm surge protection barrier as recited in claim 1, wherein the metal reinforcements include metal anchoring rods configured to be driven into the earth below grade to enhance support of the barrier wall against forces of a storm surge.

3. The storm surge protection barrier as recited in claim 2, wherein the metal reinforcements comprise I-beams nested with adjacent ones of the plurality of plastic-based structural beams.

4. The storm surge protection barrier as recited in claim 1, including a plurality of support legs projecting at an angle from a backside of the wall sections and configured to be buried in the earthen berm to further support the barrier wall against forces of a storm surge.

5. The storm surge protection barrier as recited in claim 4, wherein the support legs are angularly adjustable relative to the wall sections.

6. The storm surge protection barrier as recited in claim 1, wherein the metal reinforcements comprise metal plates interleaved between adjacent ones of the plurality of plastic-based structural beams.

7. The storm surge protection barrier as recited in claim 1, wherein the metal reinforcements comprise metal brackets spanning a gap between and secured to adjacent ones of the plurality of plastic-based structural beams.

8. The storm surge protection barrier as recited in claim 1, including a wave redirection structure disposed on a forward face of the barrier wall facing the sea.

9. The storm surge protection barrier as recited in claim 8, wherein the wave redirection structure comprises a wave deflector forming an obtuse angle with the forward face adjacent an upper end of the barrier wall to redirect waves upward and back toward the sea.

10. The storm surge protection barrier as recited in claim 1, wherein $L_{AB}$ has a length of 10-18 ft. and $L_{BG}$ has a length of 6 ft.

11. The storm surge protection barrier as recited in claim 10, wherein $L_{AB}$ has a length of 14 ft.

12. A storm surge protection barrier for a shore line bordering a body of water that is prone to storm surges, comprising:
   a plurality of individual wall sections each comprising a plurality of plastic-based structural beams;
   wherein the plurality of individual wall sections each have an above-grade upper portion of a predetermined first length, $L_{AB}$ and a below-grade lower portion of a predetermined second length $L_{BG}$;
   wherein the plurality of individual wall sections are configured to be arranged upright and to be buried in a trench of the shore line in side-by-side succession to form a continuous barrier wall with the below-grade lower portions disposed in the trench and the above-grade upper portions projecting upwardly out of the trench at a predetermined tilt angle away from the body of water;
   metal reinforcements engaging at least some of the wall sections; and
   at least one steel cable threaded through the wall sections to tie the wall sections together and further reinforce the barrier wall.

13. The storm surge protection barrier as recited in claim 12, wherein $L_{AB} > L_{BG}$ and wherein a backside of the barrier wall away from the body of water is configured to be supported by an earthen berm extending above grade of the shoreline on which it is installed.

14. The storm surge protection barrier as recited in claim 13, wherein the metal reinforcements include metal anchoring rods configured to be driven into the earth below grade to enhance support of the barrier wall against forces of a storm surge.

15. The storm surge protection barrier as recited in claim 12, including a plurality of support legs projecting at an angle from a backside of the wall sections and configured to be buried in an earthen berm to further support the barrier wall against forces of a storm surge.

16. The storm surge protection barrier as recited in claim 12, wherein the at least one steel cable is threaded through at least some of the metal reinforcements.

17. The storm surge protection barrier as recited in claim 12, wherein the metal reinforcements include metal plates interleaved between adjacent ones of the plurality of plastic-based structural beams.

18. The storm surge protection barrier as recited in claim 17, wherein the metal plates include I-beams nested with adjacent ones of the plurality of plastic-based structural beams.

19. The storm surge protection barrier as recited in claim 17, wherein the at least one steel cable is threaded through the metal plates.

* * * * *